United States Patent
Carpenter et al.

(10) Patent No.: US 9,218,523 B2
(45) Date of Patent: Dec. 22, 2015

(54) SYSTEM AND METHOD FOR DETERMINING AUTHORSHIP OF A DOCUMENT

(75) Inventors: Michael D. Carpenter, Arlington, TX (US); Ingolf Rauh, Reichenau (DE)

(73) Assignee: Siemens Industry, Inc., Alpharetta, GA (US)

(*) Notice: Subject to any disclaimer, the term of this patent is extended or adjusted under 35 U.S.C. 154(b) by 640 days.

(21) Appl. No.: 12/873,564

(22) Filed: Sep. 1, 2010

(65) Prior Publication Data

US 2011/0058742 A1    Mar. 10, 2011

Related U.S. Application Data

(60) Provisional application No. 61/239,886, filed on Sep. 4, 2009.

(51) Int. Cl.
*G06K 9/00* (2006.01)

(52) U.S. Cl.
CPC .................................. *G06K 9/00161* (2013.01)

(58) Field of Classification Search
None
See application file for complete search history.

(56) References Cited

U.S. PATENT DOCUMENTS

| | | | | |
|---|---|---|---|---|
| 5,201,011 A * | 4/1993 | Bloomberg | .......... | G06K 9/2063 382/175 |
| 5,787,414 A * | 7/1998 | Miike | .............. | G06F 17/30017 707/796 |
| 5,953,451 A * | 9/1999 | Syeda-Mahmood | ......... | 382/187 |
| 6,445,820 B1 * | 9/2002 | Love | ............................. | 382/187 |
| 6,633,671 B2 * | 10/2003 | Munich et al. | ................ | 382/187 |
| 7,245,294 B2 * | 7/2007 | Lapstun | ................. | G06F 3/0317 345/179 |
| 7,283,670 B2 * | 10/2007 | Wakeam | ................. | G06K 9/222 382/186 |
| 2004/0136083 A1 * | 7/2004 | Wang et al. | .................... | 359/642 |
| 2005/0163377 A1 * | 7/2005 | Walch | ............................ | 382/187 |
| 2005/0186017 A1 * | 8/2005 | Brandstein | ..................... | 401/215 |
| 2006/0291701 A1 | 12/2006 | Tanaka | | |
| 2009/0251338 A1 * | 10/2009 | Marggraff et al. | .............. | 341/20 |
| 2010/0085333 A1 * | 4/2010 | Akimoto | ............... | G06F 3/0317 345/179 |
| 2012/0218227 A1 * | 8/2012 | Ohashi | .................. | G06F 3/0304 345/175 |
| 2014/0086105 A1 * | 3/2014 | Kang | ...................... | H04L 67/26 370/259 |
| 2015/0154444 A1 * | 6/2015 | Kurita | ................. | G06F 3/04883 715/268 |

FOREIGN PATENT DOCUMENTS

| | | |
|---|---|---|
| EP | 1130537 A2 | 9/2001 |
| WO | 0197163 A2 | 12/2001 |

OTHER PUBLICATIONS

Jerzy Sas; "Handwriting Recognition Accuracy Improvement by Author Identification"; In Artificial Intelligence and Soft Computing—ICAISC 2006 Lecture Notes in Computer Science, Jan. 1, 2006 (pp. 682-691).

(Continued)

*Primary Examiner* — Aaron W Carter

(57) ABSTRACT

Systems, methods, and computer-readable mediums for determining authorship of a handwritten document for which the authorship is not known. A method includes scanning a document to produce a high-quality scanned image of the document, and identifying stylus information corresponding to the document. The method includes identifying authorship information corresponding to the document, and determining an authorship of the document based on the stylus information and the authorship information. In some cases, content analysis of the document is also performed and used to determine authorship.

22 Claims, 3 Drawing Sheets

(56) References Cited

OTHER PUBLICATIONS

Fornes et al. "On the Use of Textural Features for Writer Identification in Old Handwritten Music Scores"; In 10th International Conference on Document Analysis and Recognition, Jul. 26, 2009 (pp. 996-1000).

Marti et al. "Writer Identification Using Text Line Based Features"; In Document Analysis and Recognition, IEEE Comput. Soc., Sep. 10, 2001 (pp. 101-105).

Schlapbach et al. "Improving Writer Identification by Means of Feature Selection and Extraction"; In Proceedings of the 2005 Eight International Conference on Document Analysis and Recognition, Aug. 31, 2005 (pp. 131-135).

Hertel et al. "A Set of Novel Features for Writer Identification"; In Audio- and Video-Based Biometric Person Authentication. 4th International Conference, AVBPA 2003, Proceedings Jun. 9-11, 2003 (pp. 679-687).

Kokla et al. "Ink Recognition based on Statistical Classification Methods"; In Proceedings of the Second International Conference on Document Image Analysis for Libraries, Apr. 27, 2006 (pp. 254-264).

\* cited by examiner

SYSTEM AND METHOD FOR DETERMINING AUTHORSHIP OF A DOCUMENT

CROSS-REFERENCE TO OTHER APPLICATION

This application claims the benefit of the filing date of U.S. Provisional Patent Application 61/239,886, filed Sep. 4, 2009, which is hereby incorporated by reference.

TECHNICAL FIELD

The present disclosure is directed, in general, to systems and methods for determining authorship of a document with a handwriting sample.

BACKGROUND OF THE DISCLOSURE

For document security, tracing, and validation purposes, among other reasons, improved systems for determining or verifying authorship of documents is desirable.

SUMMARY OF THE DISCLOSURE

Various disclosed embodiments include systems, methods, and computer-readable mediums for determining authorship of a handwritten document for which the authorship is not known. A method includes scanning a document to produce a high-quality scanned image of the document, and identifying stylus information corresponding to the document. The method includes identifying authorship information corresponding to the document, and determining an authorship of the document based on the stylus information and the authorship information. In some cases, content analysis of the document is also performed and used to determine authorship.

Another method is for determining authorship of a handwritten document for which the authorship is not known, and is performed by at least one server data processing system. This method includes receiving metadata related to the document from a deployed system and searching a database for reference data corresponding to the metadata. The method includes transmitting the reference data to the deployed system. The method includes receiving a high-quality scanned image of a document and stylus information, authorship information, and content analysis data related to the document. The method includes determining authorship of the document based on at least two of the stylus information, the authorship information, and the content analysis data, and storing results including the stylus information, authorship information, and the determined authorship of the document.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
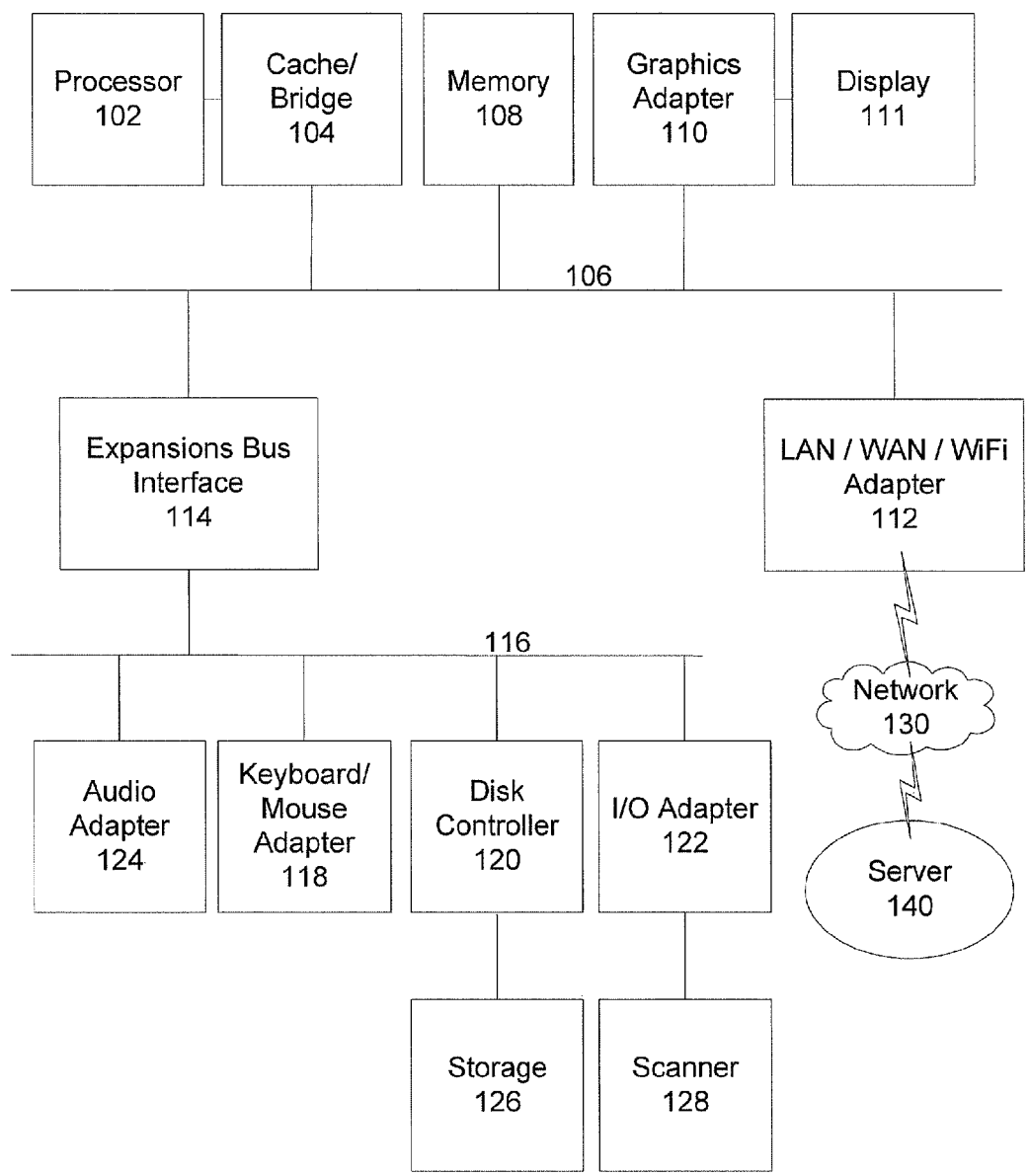
FIG. 1 depicts a block diagram of a data processing system in which an embodiment can be implemented.
Figure 2:
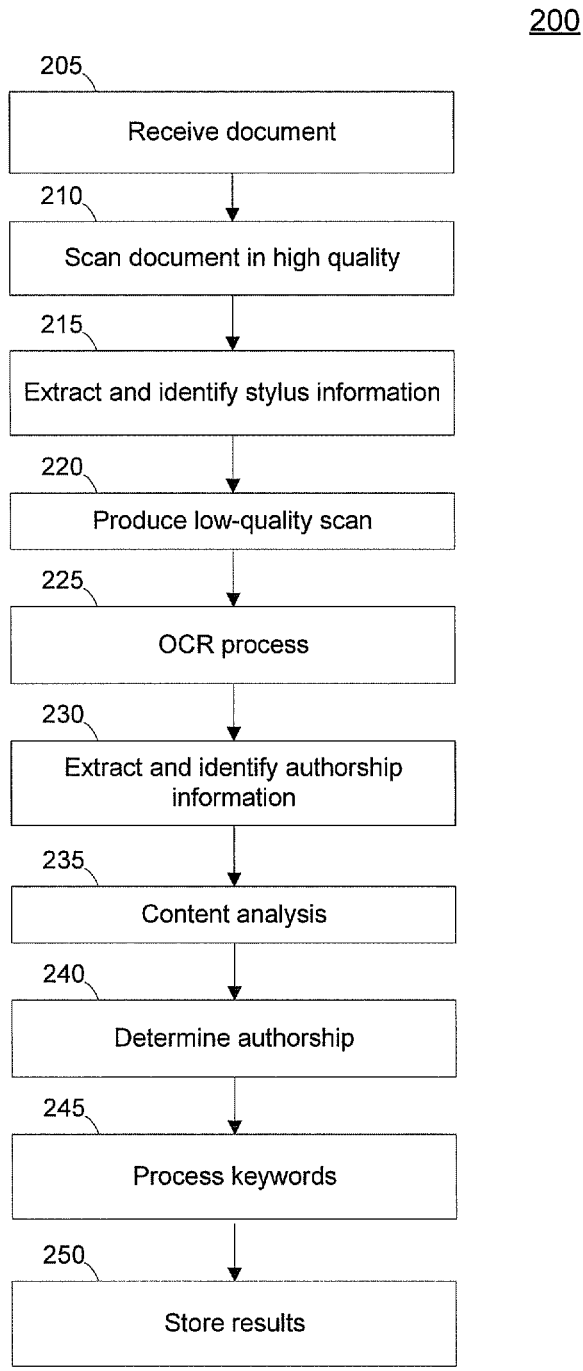
FIGS. 2 and 3 depict flowcharts of processes in accordance with disclosed embodiments.
Figure 3:
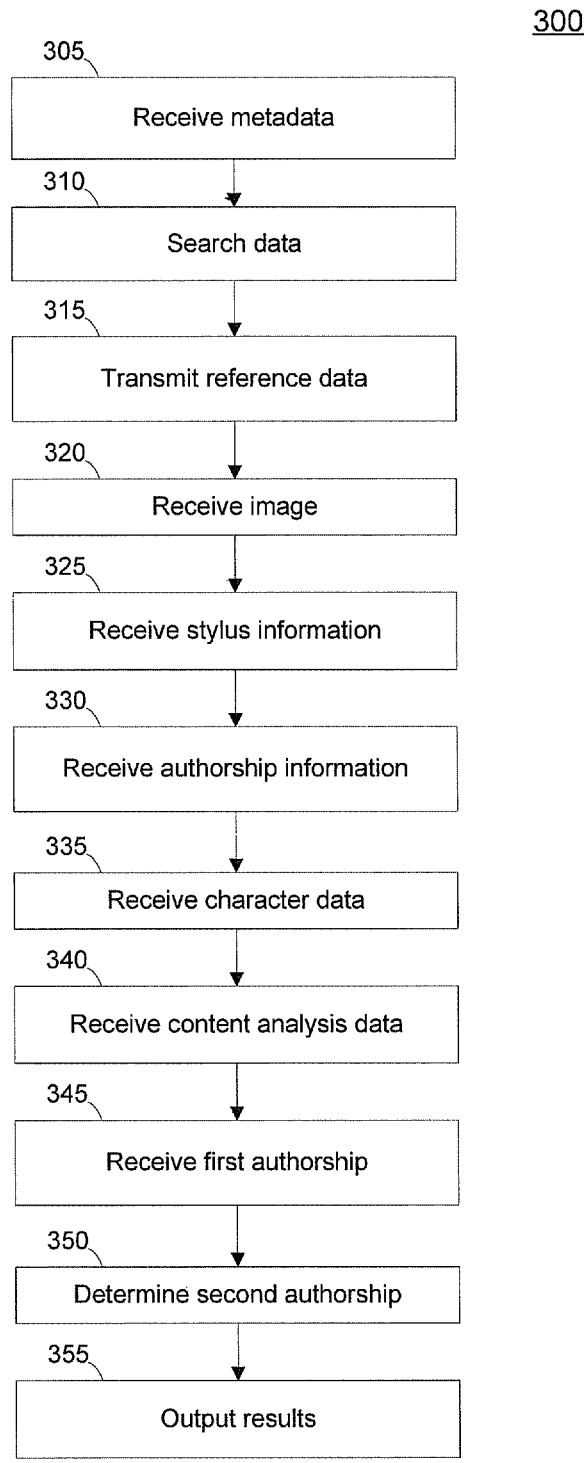

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Identifying the writer of a sample document has become an important facet of forensic science, whereby a document of unknown origin or authorship may be classified according to a specific writer. The benefits to positively making this association are related to establishing the relevance of a sample of writing, such that the sample of writing proves an association between the author and the information contained in the writing.

Some methods for automatically determining the author of an unclassified sample of handwriting are based on common pattern recognition techniques, such as establishing the fundamental axis along which script is written, and measuring stroke angles from that axis, along with stroke lengths, curve radii, stop points, grapheme generation and classification, etc.

These "Features" make up visual characteristics by which authorship may be determined. Accurately making this determination is often plagued by the relatively small size of the sample, in terms of the number of characteristic features contained therein. As a result, there may be ambiguity in the decision, meaning multiple possible authors are identified by the system.

The rate and accuracy of the authorship determination may be enhanced by classifying the ink used in handwriting samples and references. Ink classification is performed by scanning the document in high resolution and with broad radiometric spectrum (including near infrared). Thus, as the document imaging occurs to support the traditional pattern recognition-based authorship determination techniques, a more detailed image is derived, by which photometric analysis of the ink used in the writing sample is used to classify the pen used to write the sample. The combination of classification of handwriting and ink is more powerful than either one on its own, because unique ink formulations can be used to reduce the ambiguity in the determination of the writer's identity.

Further, individuals associated with specific organizations and living in specific regions and cultures tend to use writing technologies that are somewhat consistent within the culture, region and organization, and somewhat distinctive compared with other cultures, regions, and organizations. For this reason, classification of the ink and stylus technology used in a writing sample, and optionally combined with content analysis, can be important differentiating information in resolving ambiguity in the automatic identification of the writer. In addition, specific information regarding the origination of a writing stylus may be important forensic information in and of itself.

Disclosed embodiments can combine automatic pattern recognition-based writer identification techniques with automatic photometric-based ink and stylus identification to produce more reliable authorship information for a document. In some embodiments, content analysis of the writing contents is used as well to help determine authorship. The systems described herein are also generally, individually, and collectively referred to as a "Tactical Writer Identification System Topology" ("TWIST"), "tactical system", or simply "system".

FIG. 1 depicts a block diagram of a data processing system 100 in which an embodiment can be implemented, for example as a system configured to perform processes as described herein. While the description below describes the operation of a single data processing system or server system, unless otherwise specified, the description also applies to multiple data processing systems operating to together perform the processes described herein.

The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. I/O adapter 122 can be connected to a document/image scanner 128, described in more detail below, and to other I/O devices.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet, and can be or include direct links and other communication links such as secure satellite communications. The data processing system 100 can communicate over the network 130 with a server system 140, which is also not part of the data processing system 100, but can be implemented, for example, as a separate data processing system 100.

As described above, disclosed embodiments can combine automatic pattern recognition-based writer identification techniques with automatic photometric-based ink and stylus identification to produce more reliable authorship information for a document, and can reduce ambiguity in automatically identifying the human writer of a handwritten sample.

The system can further enhance the authorship recognition process by analyzing the contents of the written document. In various embodiments, such analysis can include one or more of the lengths of sentences, the use of so called stop words or function words like "if", "whether", "but", etc., and syntax measurements.

In order to use the content analysis the text must be available as clear readable text. This means an OCR will be used to read the text completely or at least to find and recognize those words which are necessary for a specific content analysis method, like the statistical measurements of a set of function words. Since the list of possible function words is limited and can be used as library for the OCR, the read rate can be very high even in handwritten documents.

The separate classification processes can be performed as separate "pre-classification" processes, independent of each other, or in a concurrent or sequential manner. In certain embodiments, the results of all different types of analysis are then combined into an arbitration function that combines the individual results to determine the authorship of the document.

In some embodiments, a system that performs this combined classification (writer, stylus, and content analysis), such as can be implemented in data processing system 100, uses a relatively high resolution color scanner with illumination and sensor technology that extends into the infrared color spectrum. Such a scanner can be implemented, for example, as scanner 128. This high resolution color image of the sample document is the basis for stylus identification, and photometric analysis of the ink provides the basis of classifying the type of ink used in the sample writing.

In a second step, a reduced resolution grey image is derived from the high resolution color, and this image is the basis for classifying the writing patterns themselves.

In a third step, optical character recognition (OCR) processes are used to "read" the text in the writing sample, and the recognized text is screened against important keywords.

Finally, in a fourth step, the content of the document is analyzed.

In order to support local classification, the system topology can allow a limited portion of the reference database of stylus and writer feature data to be downloaded from a central server database, such as in a storage on server 140, to the deployed tactical unit such as data processing system 100 as search target data. This subset of reference data can be limited according to a number of known potential authors against which the unknown sample will be screened. One basic method of limiting known authors is by the basic classification of script, such as Cyrillic or Arabic. Otherwise, a subset representing known authors with a particular association, such as a terrorist group, could be a means of limiting the reference size to facilitate local classification, and can be used by the local or tactical system as search target data.

FIG. 2 depicts a flowchart of a process 200 according to some embodiments, as may be formed for example by a deployed system, such as in a data processing system 100. Note that unless specified or logically required by certain operations, the steps in the processes below can be performed in a different order, or various steps can be performed repeatedly, sequentially, concurrently, or otherwise, some steps may be omitted as unnecessary, and the disclosed processes are only limited by the scope of the claims appended hereto. In each of the steps below, the system can store the results, display them, and/or transmit them to another system.

The system receives a document (step 205). The document can be any paper, object, letter, envelope, or other object that shows handwriting to be analyzed. "Receiving", as used herein, can include physically receiving at a system or location, receiving an electronic form of the document over a network, loading from storage, receiving as input from a user, or otherwise.

As part of this step, the system can also receive or produce metadata describing the document, such as geographic origin of the document, the document paper or media type, the subject matter, sender, or intended recipient of the document, or other data, including information useful in limiting the scope of the reference data against which the document can be compared. This step can also include transmitting this metadata to another system, such as a server system.

The system scans the document to produce a high-quality scanned image (step 210). In some cases, steps 205 and 210 may be combined, such as in the case where the document is originally received by the system as a high-quality scan, such as from another system, scanner, or otherwise, so that the combined steps can be simply considered as receiving a high-quality scan of a document. In various embodiments, a "high-quality" scan refers to producing a wide-spectrum, high-resolution color image of the document. The high-quality scanned image can be stored by the system and/or transmitted to another system for archival or further processing.

From the high-quality scanned image, the system extracts and identifies stylus information (step 215). The stylus information relates to the stylus used to produce the handwriting on the document and reproduced in the high-quality scanned image. This step can include extracting stylus identification features, and comparing these features to known stylus features corresponding to known stylus types that are received by the system as search target data. The step can include producing a stylus identification of the stylus information based on the comparison, with or without a confidence factor indicating how probable it is that the stylus identification corresponds to the actual type of stylus used to produce the document. The stylus information can include a photometric ink analysis, information regarding the physical characteristics of the stylus and ink used to produce the document, and other information.

The system produces a low-quality scanned image corresponding to the high-quality scanned image (step 220). This step can include reducing the resolution, size, color data, or other information of the high-quality scanned image, so that "low-quality" defines this image with respect to the high-quality scanned image. In some embodiments, the low-quality scanned image is a lower-resolution grayscale image corresponding all or a portion of the high-quality scanned image. In some embodiments, this low-quality scanned image is received by the system together with or independent of the high-quality scanned image.

The system performs an OCR process on the document, to extract character data (step 225). The OCR process is preferably performed from the low-quality scanned image, but could be performed from the high-quality scanned image. The character data can be stored in association with one or both of the low-quality scanned image and the high-quality scanned image.

The system extracts and identifies authorship information (step 230). The extraction is preferably performed from the low-quality scanned image, but could be performed from the high-quality scanned image. This step can include extracting authorship identification features, and comparing these features to known authorship features corresponding to known authors that are received by the system as search target data. The step can include producing an author identification of the document based on the comparison, with or without a confidence factor indicating how probable it is that the author identification corresponds to the actual author of the document. Authorship information can include specific handwriting or rhetorical patterns, the type, position, direction, or other physical characteristics of the handwriting, the language used, and other information.

The system optionally performs a content analysis process on the character data (step 235), that can include one or more of the lengths of sentences, the use of so called stop words or function words like "if", "whether", "but", etc., and syntax measurements, and other content analysis techniques. The results of the content analysis can be compared to the content of known authors to determine authorship. The system can perform such a comparison using known author information of the search target data.

The system determines an authorship of the document based on the identified authorship information and the identified stylus information, and optionally also based on the content analysis (step 240). In some embodiments, the determination is performed using the stylus identification and the author identification, and can also use any confidence factors. In some cases, the system uses known author profile data received by the system; this author profile data can include information that correlates known authors with known stylus types. Using the various data described herein, combining stylus information and authorship information, the system determined authorship of the document is more likely to be correct than in prior systems. The determined authorship can also include a confidence factor.

The system processes keywords against the character data (step 245). This step can include receiving keywords for processing, and comparing the received keywords against the character data to determine if any keywords appear in the document. This step can include classifying the document based on any keywords that appear in the document.

The system stores data related to the document (step 250), including optionally displaying the data to a user and transmitting the data to another system. The data can include such information as the low-quality scanned image, the high-quality scanned image, the character data, any keywords that appear in the document, the identified authorship information, the identified stylus information, the content analysis data, and the determined authorship of the document, among other data.

The tactical system can also perform processes for adding reference data to the centralized database, for which the author and stylus are known with adequate certainty. The communication between the tactical unit and centralized portion of the system can be a secure, high speed data link, including a satellite link, to support primitive locations.

A centralized element of the system, such as in a server 140, can provide additional functionality, starting with a secure repository for image and feature data. The central system element can also allows for manual forensic analysis to be performed offline, to support instances in which the automatic classification cannot be completed, due to sample size, image quality, etc.

FIG. 3 depicts a flowchart of a process 300 that can be performed by the centralized system element, such as server 140, in accordance with some embodiments. Note that unless specified or logically required by certain operations, the steps below can be performed in a different order, or various steps can be performed repeatedly, sequentially, concurrently, or otherwise, and the disclosed processes are only limited by the scope of the claims appended hereto. In each of the steps below, the system can store the results, display them, and/or transmit them to another system.

The system receives a metadata corresponding to a document from a tactical unit (step 305). The document can be any paper, object, letter, envelope, or other object that shows handwriting to be analyzed. As part of this step, the system can establish a data record for the new document for storage in a database. The metadata can include information useful in limiting the scope of the reference data against which the document can be compared.

The system searches a database for reference data corresponding to the metadata (step 310). This step is useful for limiting the amount of data transmitted to the tactical system. The reference data can include such information as inks, stylus information, authorship data, content analysis data, and other reference data that enables the tactical system to perform the processes described herein.

The system transmits the reference data to the tactical system to be used as search target data (step 315).

The system receives one or more scanned images of the document (or a portion of the document) from the tactical system (step 320). In some cases, this includes both a high-quality scanned image and a low-quality scanned image; in other cases, only one of these images is received. In some specific embodiments, the system can receive only the high-quality scanned image and the server can then produce from it a low-quality scanned image.

The system receives stylus information related to the document (step 325). This can be received from the tactical system. In other embodiments, the stylus information can be generated by the server system using the database and processes similar to those described above.

The system receives authorship information related to the document (step 330). This can be received from the tactical system. In other embodiments, the authorship information can be generated by the server system using the database and processes similar to those described above.

The system can receive character data related to the document (step 335). This can be received from the tactical system, or in other embodiments, can be produced by an OCR process performed by the server system based on the high-quality scanned image or the low-quality scanned image.

The system can receive content analysis data related to the document (step 340). This can be received from the tactical system, or in other embodiments, can be produced by a content analysis process performed by the server system based on the character data.

The system can receive a first authorship of the document based on the identified authorship information and the identified stylus information (step 345). The first authorship (or "received authorship") is typically the authorship as determined by the tactical system, and can be received from the tactical system. In other cases, this step is omitted, and the server system performs the only authorship determination.

The system determines a second authorship (or "determined authorship") of the document based on the authorship information and the stylus information (step 350). In some embodiments, the determination is performed using at least two of the stylus information, the authorship information, and the content analysis data, and can be performed using the system's entire database of known author information and stylus information. This will typically be a broader data set than the target search data used by the tactical system, and may result in a different determined authorship. As part of this step, the system can perform an arbitration process between one or more of the stylus information, the authorship information, the content analysis data, and the received authorship to determine the most likely actual authorship as the determined authorship.

The system outputs results of the process (step 355), which can include displaying the data to a user, for example for verification, transmitting the data to another system such as the tactical system, and storing the results. The results can include such information as the low-quality scanned image, the high-quality scanned image, the character data, any keywords that appear in the document, the identified authorship information, the identified stylus information, the first determined authorship of the document, the second determined authorship of the document, the content analysis data, and an indication as to whether the first determined authorship matches the second determined authorship, among other data.

The combination of processes allows the deployed tactical system to perform an efficient analysis of authorship based on authorship information, stylus information, and/or content analysis, including limiting the data used for analysis to specific target search data, whether or not it is currently connected to communicate with a server. The central server can perform an independent analysis using its entire database of data, which may provide a different or improved result, and these results can be returned to the tactical system. Used together, the systems can provide accurate and reliable determinations of the authorship of a document.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. Various embodiments can include a machine-readable medium encoded with instructions that, when executed, cause one or more data processing systems to perform processes as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for determining authorship of a handwritten document for which the authorship is not known, the method performed by at least one data processing system, comprising:
    scanning a document to produce a first scanned image of the document, wherein the first scanned image is a wide-spectrum color image of the document;
    identifying stylus information corresponding to the document from the first scanned image, the stylus information corresponding to a type of a stylus used to produce the document and indicating physical characteristics of the stylus or an ink used by the stylus to produce the document;
    identifying authorship information corresponding to the document;
    determining an authorship of the document based on the stylus information and the authorship information; and
    storing the stylus information, authorship information, and authorship of the document.

2. The method of claim 1, wherein the at least one data processing system produces a second scanned image from the first scanned image, the second scanned image of lower resolution than the first scanned image, and performs an OCR process on the second scanned image to produce character data corresponding to the document.

3. The method of claim 2, wherein the at least one data processing system compares keywords against the character data and performs a classification of the document based on the comparison.

4. The method of claim 2, wherein the at least one data processing system performs a content analysis on the character data, wherein the content analysis includes analyzing one or more of the lengths of sentences, the use of stop words or the use of function words.

5. The method of claim 4, wherein the at least one data processing system determines the authorship of the document also based on the content analysis.

6. The method of claim 1, wherein the stylus information includes a photometric ink analysis of the ink used by the stylus.

7. The method of claim 1, wherein the authorship information includes at least one of specific handwriting, rhetorical patterns, the type, position, direction, and other physical characteristics of the handwriting, and the language used in the document.

8. The method of claim 1, wherein the at least one data processing system transmits the first scanned image, the stylus information, authorship information, and authorship of the document to a server system.

9. The method of claim 1, wherein the at least one data processing system transmits metadata related to the document to a server system, receives search target data from the server system, and performs the identifying steps based on the search target data.

10. A data processing system comprising a processor, storage, and accessible memory, the data processing system configured to perform the steps of:
    receiving a first scanned image of a document, wherein the first scanned image is a wide-spectrum color image of the document;
    identifying stylus information corresponding to the document from the first scanned image, the stylus information corresponding to a type of stylus used to produce the document and indicating physical characteristics of the stylus or an ink used by the stylus to produce the document;
    identifying authorship information corresponding to the document;
    determining an authorship of the document based on the stylus information and the authorship information; and
    storing the stylus information, authorship information, and authorship of the document.

11. A method for determining authorship of a handwritten document for which the authorship is not known, the method performed by at least one server data processing system, comprising:
    receiving metadata related to the document from a deployed system;
    searching a database for reference data corresponding to the metadata;

transmitting the reference data to the deployed system;

receiving a first scanned image of a document, wherein the first scanned image is a wide-spectrum color image of the document;

receiving stylus information and authorship information related to the document, the stylus information corresponding to a type of stylus used to produce the document and indicating physical characteristics of the stylus or an ink used by the stylus to produce the document, the stylus information identified from the first scanned image;

receiving content analysis data corresponding to the document;

determining a determined authorship of the document based on the stylus information and based on at least one of the authorship information and the content analysis data; and storing results including the stylus information, authorship information, and the determined authorship of the document.

12. The method of claim 11, wherein the at least one server data processing system produces a second scanned image from the first scanned image, the second scanned image of lower resolution than the first scanned image, and performs an OCR process on the second scanned image to produce character data corresponding to the document.

13. The method of claim 11, wherein the stylus information is received from the deployed system.

14. The method of claim 11, wherein the authorship information is received from the deployed system.

15. The method of claim 11, wherein the content analysis data is received from the deployed system.

16. The method of claim 11, wherein at least one of the stylus information, authorship information, and content analysis data is generated by the at least one server data processing system.

17. The method of claim 11, wherein the at least one server data processing system also receives a received authorship and stores an indication of whether the received authorship matches the determined authorship.

18. The method of claim 17, wherein determining a determined authorship of the document is also based on the received authorship.

19. The method of claim 1, wherein the at least one server data processing system transmits the determined authorship to the deployed system.

20. A server data processing system comprising a processor, storage, and accessible memory, the server data processing system configured to perform the steps of:

receiving metadata related to the document from a deployed system;

searching a database for reference data corresponding to the metadata;

transmitting the reference data to the deployed system;

receiving a first scanned image of a document, wherein the first scanned image is a wide-spectrum color image of the document;

receiving stylus information and authorship information related to the document, the stylus information corresponding to a type of stylus used to produce the document and indicating physical characteristics of the stylus or an ink used by the stylus to produce the document, the stylus information identified from the first scanned image;

receiving content analysis data corresponding to the document;

determining a determined authorship of the document based on the stylus information and based on at least one of the authorship information and the content analysis data; and storing results including the stylus information, authorship information, and the determined authorship of the document.

21. A method for determining authorship of a handwritten document for which the authorship is not known, the method performed by at least one data processing system, comprising:

identifying stylus information, authorship information, and content analysis information corresponding the handwritten document, the stylus information corresponding to a type of stylus used to produce the document and indicating physical characteristics of the stylus or an ink used by the stylus to produce the document;

determining an authorship of the document based on the identified stylus information, authorship information, and content analysis information; and storing the stylus information, authorship information, content analysis information and authorship of the document.

22. A method for determining authorship of a handwritten document for which the authorship is not known, the method performed by at least one server data processing system, comprising:

receiving a scanned image of the document and metadata related to the document from a deployed data processing system, wherein the scanned image is a wide-spectrum color image of the document;

identifying stylus information, authorship information, and content analysis information corresponding the handwritten document;

determining a determined authorship of the document based on the stylus information and based on at least one of the authorship information and the content analysis data, the stylus information corresponding to a type of stylus used to produce the document and indicating physical characteristics of the stylus or an ink used by the stylus to produce the document;

storing results including the stylus information, authorship information, and the determined authorship of the document; and transmitting the determined authorship of the document to the deployed data processing system.

* * * * *